US007790982B2

(12) United States Patent
Weeks et al.

(10) Patent No.: US 7,790,982 B2
(45) Date of Patent: Sep. 7, 2010

(54) ELECTRICAL WIRING DEVICE WITH A CENTER NIGHTLIGHT AND A PLURALITY OF SAFETY FEATURES

(75) Inventors: Richard Weeks, Little York, NY (US); Jeffrey C. Richards, Baldwinsville, NY (US); Gary O. Wilson, Syracuse, NY (US); Gerald R. Savicki, Jr., Canastota, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 501 days.

(21) Appl. No.: 11/933,947

(22) Filed: Nov. 1, 2007

(65) Prior Publication Data

US 2009/0035967 A1 Feb. 5, 2009

Related U.S. Application Data

(63) Continuation-in-part of application No. 11/609,793, filed on Dec. 12, 2006, now Pat. No. 7,312,394, and a continuation-in-part of application No. 11/294,167, filed on Dec. 5, 2005, and a continuation-in-part of application No. 11/242,406, filed on Oct. 3, 2005, now Pat. No. 7,285,721, and a continuation-in-part of application No. 10/726,128, filed on Dec. 2, 2003, now Pat. No. 6,989,489.

(51) Int. Cl.
*H02G 3/08* (2006.01)
*H02H 3/00* (2006.01)
*H02H 9/00* (2006.01)

(52) U.S. Cl. ............................ 174/50; 174/53; 174/59; 361/49; 361/56; 362/42; 362/95; 362/253; 439/93

(58) Field of Classification Search .................. 174/50, 174/53, 57, 58, 520, 66, 67, 17 R, 59; 362/641, 362/642, 646, 800, 362, 253, 42, 95; 439/106, 439/107, 535, 93; 385/76, 92; 361/42–51, 361/56; 335/165–176, 18; 220/3.2–3.94, 220/241, 242, 4.02; 200/293, 297, 5 R, 317
See application file for complete search history.

(56) References Cited

U.S. PATENT DOCUMENTS 4,485,282 A 11/1984 Lee
4,636,914 A 1/1987 Belli (Continued)

OTHER PUBLICATIONS

U.S. Appl. No. 11/609,793, filed Dec. 12, 2006, Radosavljevic.
U.S. Appl. No. 11/294,167, filed Dec. 5, 2005, Savicki, Gerald.
U.S. Appl. No. 11/242,406, filed Oct. 3, 2005, Savicki, Gerald.
U.S. Appl. No. 10/726,128, filed Dec. 2, 2003, Savicki, Gerald.

*Primary Examiner*—Angel R Estrada
(74) *Attorney, Agent, or Firm*—Daniel P. Malley; Bond, Schoeneck & King, PLLC

(57) ABSTRACT

The present invention is directed to an electrical wiring device that includes a housing having a plurality of line terminals and a plurality of load terminals. A cover assembly includes a first set of receptacle openings and a second set of receptacle openings. A plurality of receptacle terminals are disposed in the housing and coupled to the plurality of load terminals. A first protective shutter assembly is disposed in the cover assembly between the first set of receptacle openings and the first set of receptacle terminals and a second protective shutter assembly disposed in the cover assembly between the second set of receptacle openings and the second set of receptacle terminals. A light assembly is disposed in a central portion of the cover assembly between the first set of receptacle openings and the second set of receptacle openings. The light assembly has a light transmission region occupying a substantial portion of a width of the cover assembly.

25 Claims, 5 Drawing Sheets

U.S. PATENT DOCUMENTS

| | | | | |
|---|---|---|---|---|
| 4,688,134 | A | 8/1987 | Freeman et al. | |
| 4,725,249 | A | 2/1988 | Blackwood et al. | |
| 5,036,168 | A | 7/1991 | Kikuchi et al. | |
| 5,161,240 | A | 11/1992 | Johnson | |
| 5,500,487 | A | 3/1996 | Leon | |
| 5,510,760 | A | 4/1996 | Marcou et al. | |
| 5,562,493 | A | 10/1996 | Ferrill et al. | |
| 5,637,000 | A | 6/1997 | Osterbrock et al. | |
| 5,783,787 | A | 7/1998 | Data | |
| 5,839,909 | A | 11/1998 | Calderara et al. | |
| 5,874,693 | A * | 2/1999 | Rintz | 174/66 |
| 5,990,436 | A | 11/1999 | Balaban et al. | |
| 6,087,588 | A * | 7/2000 | Soules | 174/66 |
| 6,309,248 | B1 | 10/2001 | King | |
| 6,623,296 | B2 | 9/2003 | Okamoto | |
| 6,805,469 | B1 | 10/2004 | Barton | |
| 6,873,231 | B2 | 3/2005 | Germain et al. | |
| 6,949,994 | B2 | 9/2005 | Germain et al. | |
| 6,963,260 | B2 | 11/2005 | Germain et al. | |
| 6,969,801 | B2 | 11/2005 | Radosavljevic et al. | |
| 6,989,489 | B1 * | 1/2006 | Savicki, Jr. | 174/50 |
| 6,998,945 | B2 | 2/2006 | Huang et al. | |
| 7,026,895 | B2 | 4/2006 | Germain et al. | |
| 7,034,224 | B2 | 4/2006 | Kim et al. | |
| 7,036,948 | B1 | 5/2006 | Wyatt | |
| 7,038,561 | B2 | 5/2006 | Esty | |
| 7,052,314 | B1 | 5/2006 | Rose | |
| 7,118,235 | B2 | 10/2006 | Barton | |
| 7,179,992 | B1 | 2/2007 | Packard et al. | |
| 7,273,983 | B1 * | 9/2007 | Rintz | 174/66 |
| 7,506,990 | B2 * | 3/2009 | Glazner | 362/276 |
| 7,554,033 | B1 * | 6/2009 | Bhosale et al. | 174/53 |
| 7,576,285 | B1 * | 8/2009 | Savicki, Jr. | 174/53 |
| 2005/0162789 | A1 | 7/2005 | Germain et al. | |
| 2006/0022777 | A1 | 2/2006 | Germain et al. | |
| 2006/0055490 | A1 | 3/2006 | Germain et al. | |

* cited by examiner

ELECTRICAL WIRING DEVICE WITH A CENTER NIGHTLIGHT AND A PLURALITY OF SAFETY FEATURES

CROSS-REFERENCE TO RELATED APPLICATIONS

This is a continuation-in-part of U.S. patent application Ser. No. 11/609,793 filed on Dec. 12, 2006 and U.S. patent application Ser. No. 11/294,167 filed on Dec. 5, 2005, which is a continuation-in-part of U.S. patent application Ser. No. 11/242,406 (Now U.S. Pat. No. 7,285,721) filed on Oct. 3, 2005, which is a continuation application of U.S. patent application Ser. No. 10/726,128 filed on Dec. 2, 2003 (now U.S. Pat. No. 6,989,489), the contents of which are relied upon and incorporated herein by reference in its entirety, and the benefit of priority under 35 U.S.C. §120 is hereby claimed, U.S. patent application Ser. No. 10/726,128 claims the benefit of priority under 35 U.S.C. §119(e) to U.S. Provisional Patent Application 60/439,370 filed Jan. 9, 2003.

BACKGROUND OF THE INVENTION

1. Field of the Invention

The present invention relates generally to electrical wiring devices, and particularly to electrical wiring devices having safety features.

2. Technical Background

The AC power interface for the typical electrical distribution system is commonly known as the breaker panel. The size of the breaker panel may vary depending on whether it is disposed within a residence, commercial building or some other such facility. The breaker panel, of course, terminates the AC power service provided by the power utility and distributes AC power to one or more branch electric circuits installed in the structure. Branch electric circuits often include one or more electrical wiring devices, such as receptacle outlets, that accommodate electrical power plugs.

Electrical wiring devices are provided in electrically non-conductive housings. The housing includes electrical line terminals that are electrically insulated from electrical load terminals. The line terminals connect the wiring device to conductive wires from the breaker panel. Load terminals are connected to downstream wiring that is configured to propagate AC power to one or more downstream electrical loads. Those of ordinary skill in the pertinent art will understand that the term "load" refers to an appliance, a switch, or some other electrically powered device. The load terminals of an electrical wiring device are sometimes referred to as "feed-through" terminals. As alluded to above, the AC power propagating through a device may be accessed by the user by way of a power plug. As everyone knows, the power plug and cord assembly for a portable electrical device functions as a portable device's AC power interface. A receptacle outlet provide power to portable "user-accessible loads" when the plug is inserted into a receptacle outlet. Certain types of faults are known to occur in branch electric circuits and electrical wiring systems. These faults represent serious safety issues that may result in fire, shock or electrocution if not addressed properly.

Accordingly, branch electric circuits typically employ one or more electric circuit protection devices. Protective devices employ a circuit interrupter disposed between the line terminals and the load terminals. The circuit interrupter provides power to the load terminals under normal conditions, but breaks electrical connectivity when the protective device detects a fault condition in the load circuit. There are several types of electric circuit protection devices including ground fault circuit interrupters (GFCIs), arc fault circuit interrupters (AFCIs), transient voltage surge suppressors (TVSSs), or surge protective devices (SPDs).

In many applications, users desire to install one or more of the aforementioned conventional wiring devices in an outdoor space, a garage, or some other space that may be exposed to dust, moisture, insects, and/or other contaminants. Unfortunately, conventional wiring devices are not equipped to repel such things. In the event that water is applied, whether by design or by accident, a live wiring device may become a shock hazard. Conventional wiring devices have other drawbacks. Even if the moisture level does not constitute a shock hazard, corrosion may develop over time. A conventional wiring device may also degrade in a dusty environment, or be compromised by insect infestation. A conventional protective wiring device includes sensitive circuitry that makes these devices particularly vulnerable to contaminants. Protective devices such as GFCIs are often installed in the most environmentally exposed areas. For example, GFCI protection is required for outdoor receptacles, bathrooms, kitchens, basements and garages. Finally, conventional wiring devices allow air to flow between the device and the interior of the wall box. Such air drafts may compromise the energy efficiency of the structure.

Another safety issue relates to the insertion of foreign objects into receptacle openings. In many cases, young children and toddlers insert objects such as paper clips or screwdriver blades into the receptacle contact openings. Unfortunately, this scenario often results in an electric shock, burns, or electrocution.

Another safety issue that is of great concern relates to the amount of ambient lighting in a given room or space. In a scenario that most people are familiar with, a person entering a darkened room will usually attempt to locate the wall switch and turn the wall switch to the ON position before entering. Sometimes the wall switch is not located near the door, i.e., at the point of entry, and the person will begin to search for the light switch. This person begins to "feel" her way around the darkened room in an attempt to navigate around objects such as tables and chairs. More often than not, the person successfully finds the wall switch and manages to turn the lights ON. On the other hand, the darkened room represents a safety issue. For example, if an object is disposed relatively low to the floor surface the person may trip over it and suffer an injury. This scenario applies to other types of spaces, such as corridors, theater aisles, stairways, patios, garages, ingress/egress areas, out-buildings, outdoor pathways and the like.

There are situations where a light switch is not available, or is not readily available. There are other situations where the person entering the darkened room is disinclined to turn the lights ON as a matter of courtesy. Several examples immediately come to mind. A person entering a darkened theatre would expect to incur the wrath of his fellow patrons if he turned the theatre lights ON while finding a seat. In another situation, a person may desire to temporarily enter a room occupied by a person who is sleeping. For example, a parent may want to check on the condition of a sleeping infant, or tend to someone who is ill, without having to turn the lights ON.

In one approach that has been considered, a portable lighting device may be inserted into an electrical receptacle located in the room to function as a "night light." While this arrangement may provide a temporarily solution to the potentially unsafe condition described above, it has certain drawbacks associated with it. The most obvious drawback in getting the portable nightlight into a socket in a darkened room is finding the socket in the first place. While this problem may be eliminated with forethought, many people live busy lives and have other things on their minds. On the other hand, once the night light is inserted into the receptacle, it may remain there day and night for an extended period of time and represent a waste of energy. After awhile, the resident may notice the problem and unplug the light during daylight hours if the space admits natural light. Unfortunately, the resident may forget to plug the light back into the socket until after night fall and finds himself revisiting the darkened room scenario. In addition, once a small night light is unplugged from the receptacle there is the possibility that it will become lost, misplaced, or damaged from excessive handling.

In another approach that has been considered, a light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy of the device.

In yet another approach that has been considered, the aforementioned drawbacks are addressed by providing a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. As such, conventional devices are typically arranged such that the lens covering the light element is disposed in one portion of the wiring device cover and the sensor element is disposed in a second portion of the cover, with sufficient space therebetween. If the wiring device includes another functional element such as a receptacle, the sensor may be disposed between the receptacle and the light's lens cover. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner.

What is needed is an electrical wiring device that includes a light source that is both adapted to a wiring device form factor and configured to address the drawbacks and needs described above. A light emitting wiring device is needed that provides a sufficient amount of illumination when the ambient light in a given space falls below a safe level. The wiring device must maximize the effective area of illumination without sacrificing sensor isolation. What is also needed is a wiring device that addresses both safety issues, i.e., electrical fault conditions as well as ambient lighting issues.

SUMMARY OF THE INVENTION

The present invention addresses the needs described above by providing an electrical wiring device that includes a light source that is both adapted to a wiring device form factor and configured to address the drawbacks and needs described above. The wiring device of the present invention may be configured to address both safety issues, i.e., electrical fault conditions as well as ambient lighting issues.

One aspect of the present invention is directed to an electrical wiring device that includes a housing having a plurality of line terminals and a plurality of load terminals. A cover assembly is coupled to the housing. The cover assembly includes a first set of receptacle openings and a second set of receptacle openings. A plurality of receptacle terminals are disposed in the housing and coupled to the plurality of load terminals. The plurality of receptacle terminals include a first set of receptacle terminals in communication with the first set of receptacle openings and a second set of receptacle terminals in communication with the second set of receptacle openings. A first protective shutter assembly is disposed in the cover assembly between the first set of receptacle openings and the first set of receptacle terminals and a second protective shutter assembly disposed in the cover assembly between the second set of receptacle openings and the second set of receptacle terminals. Each protective shutter assembly is configured to move from a closed position to an open position in response to engaging a set of plug blades to thereby establish electrical continuity between the corresponding set of receptacle terminals and the set of plug blades. A light assembly is disposed in a central portion of the cover assembly between the first set of receptacle openings and the second set of receptacle openings. The light assembly is coupled to the plurality of line terminals or the plurality of load terminals. The light assembly has a light transmission region occupying a substantial portion of a width of the cover assembly. The light assembly is selectively driven from a deenergized state to a light emitting state in response to a predetermined stimulus. The light assembly directs emitted light into a spatial volume proximate the device via the light transmissive region in the light emitting state.

In another aspect, the present invention is directed to an electrical wiring device that includes a housing including a plurality of line terminals. A cover assembly is coupled to the housing. The cover assembly including a first set of receptacle openings and a second set of receptacle openings. A plurality of receptacle terminals are disposed in the housing and coupled to the plurality of line terminals. The plurality of receptacle terminals include a first set of receptacle terminals in communication with the first set of receptacle openings and a second set of receptacle terminals in communication with the second set of receptacle openings. A first protective shutter assembly is disposed in the cover assembly between a portion of the first set of receptacle openings and the first set of receptacle terminals and a second protective shutter assembly is disposed in the cover assembly between the second set of receptacle openings and the second set of receptacle terminals. Each protective shutter assembly is configured to move from a closed position to an open position in response to engaging a set of plug blades to thereby establish electrical continuity between the corresponding set of receptacle terminals and the set of plug blades. A light assembly is disposed in a central portion of the cover assembly between the first set of receptacle openings and the second set of receptacle openings, the light assembly being electrically coupled to the plurality of line terminals. The light assembly has a light transmission region occupying a substantial portion of a width of the user accessible surface of the cover assembly. The light assembly is selectively driven from a deenergized state to a light emitting state in response to a predetermined stimulus. The light assembly directs emitted light into a spatial volume proximate the device via the light transmissive region in the light emitting state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
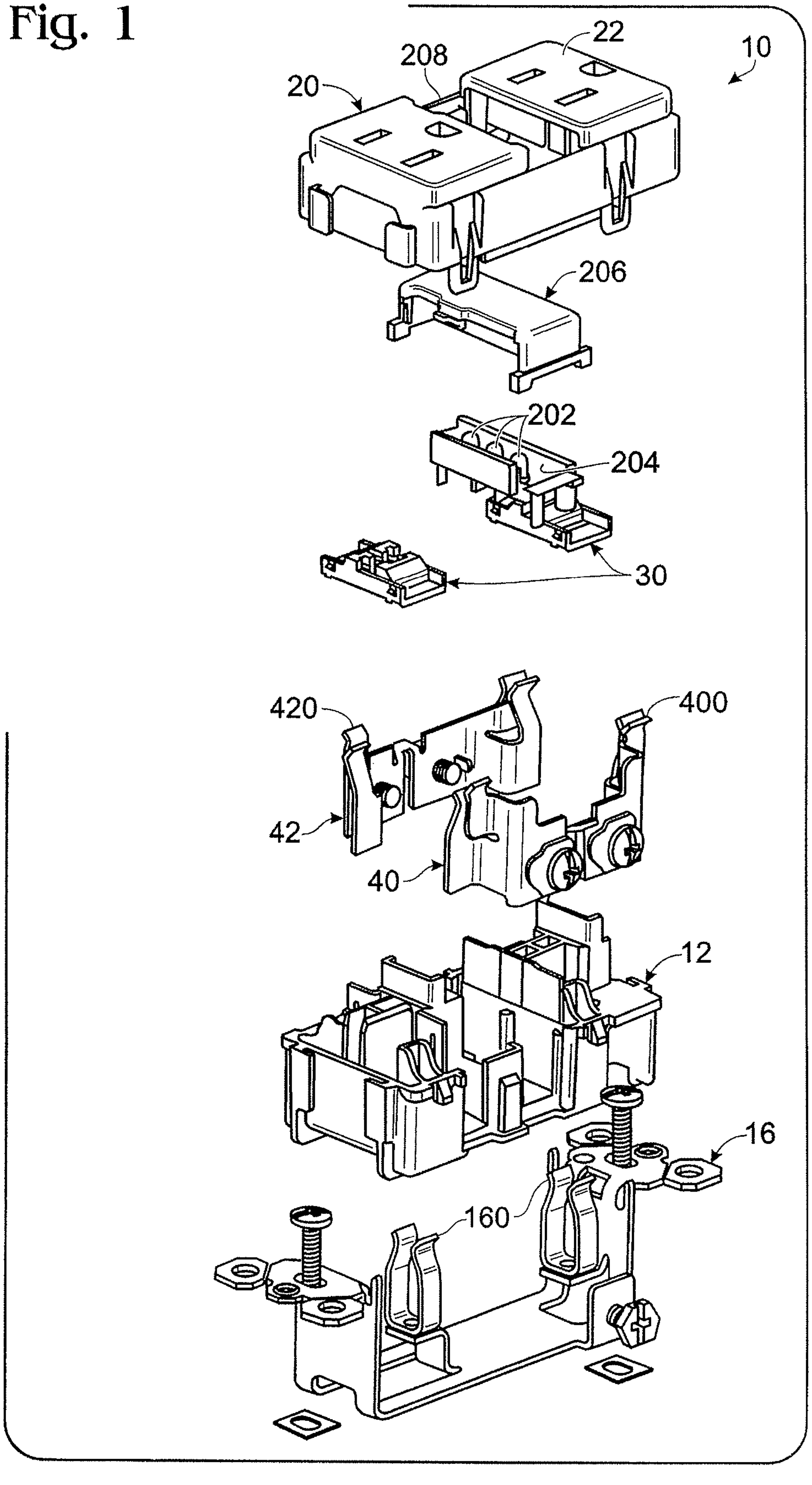
FIG. 1 is an exploded view of the device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wiring device of the present invention is shown in FIG. 1, and is designated generally throughout by reference numeral 10.

As embodied herein and depicted in FIG. 1, an exploded view of the device 10 in accordance with a first embodiment of the present invention is disclosed. Device 10 includes a receptacle outlet device with center night light assembly 200. Cover member includes receptacle openings 22 disposed at either end. In the central portion, opening 208 is formed therein. Opening 208, of course, is configured to accommodate lens element 206. The lens 206 is configured to mate with reflector member 204 which includes white LEDs 202 disposed therein. The LEDs 202 are connected to pig tailed wires connected across receptacle terminal structures 40, 42. Of course, the cover member 20 also accommodates shutters 30.

The hot and neutral receptacle terminals (40, 42) are disposed within back body member 12. When the ground strap structure 16 is inserted into body member 12 from behind, the hot receptacle terminals 420, the neutral receptacle terminals 400, and the ground terminals 160 are perfectly aligned with their respective face receptacle openings 22 in cover 20.

In another embodiment of the present invention wiring device 10 may include a two-ply gasket structure disposed between front cover portion 20 and rear body 12. The gasket structure may include an outer gasket adhesively mated with an inner gasket member. Reference is made to U.S. patent application Ser. No. 11/677,208 which is incorporated herein by reference as though fully set forth in its entirety, for a more detailed explanation of various embodiments of the gasket structure.

Figure 2:
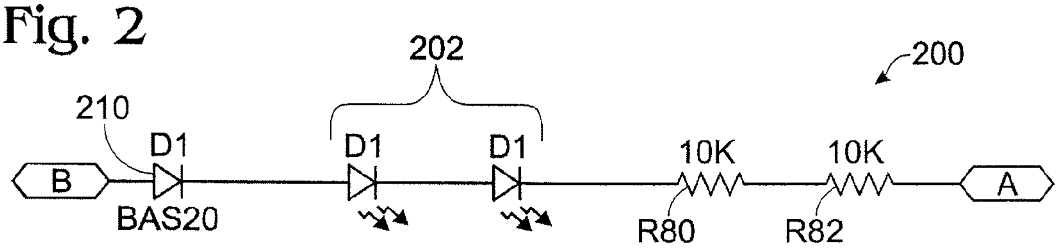
FIG. 2 is a schematic of the center night light assembly in accordance with the first embodiment of the present invention.

Referring to FIG. 2, a schematic of the center night light assembly 200 in accordance with the first embodiment of the present invention is shown. The light assembly circuit 200 includes a current rectifying diode D1 in series with LEDs 202 and current limiting resistors R80, and R82. Those skilled in the art will understand that the lighting assembly 200 is energized when power is applied to device 10.

Figure 3:
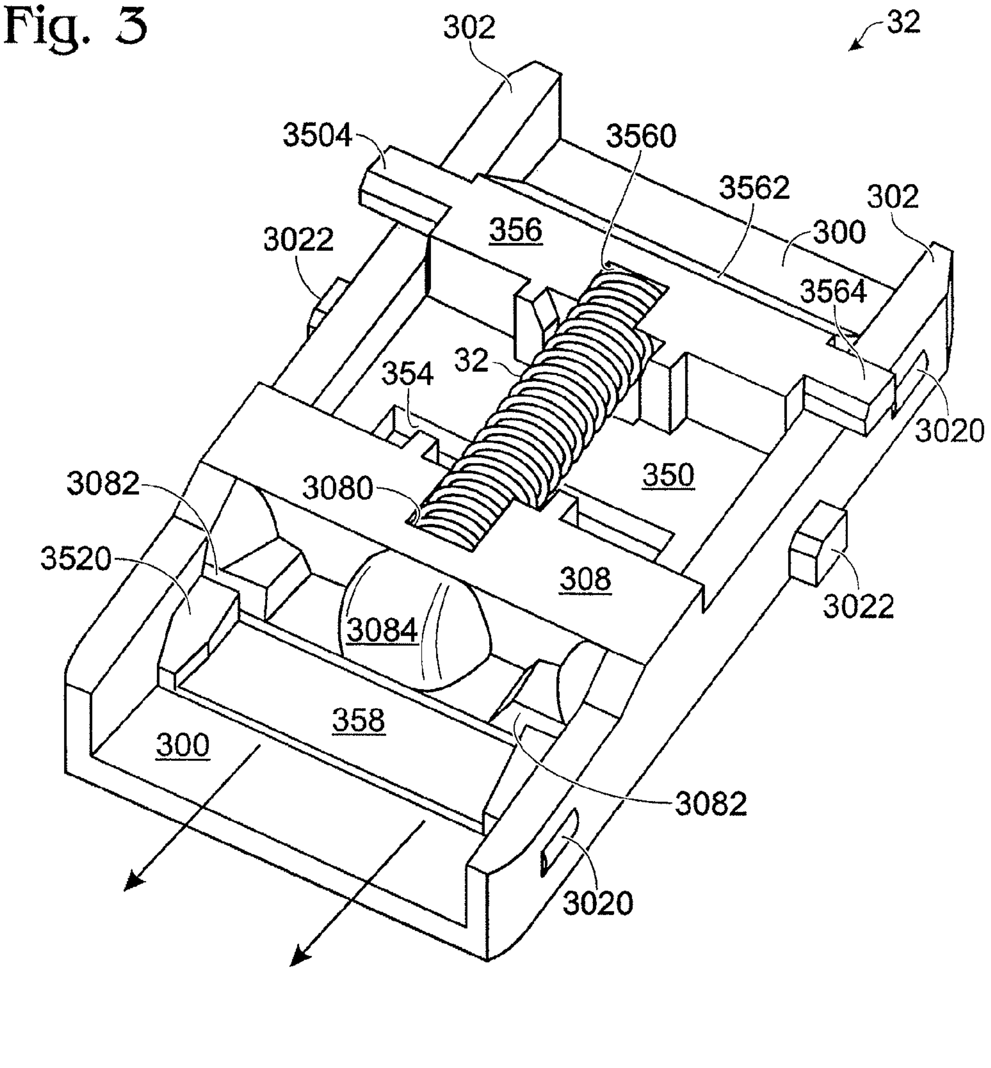
FIG. 3 is a perspective view of the shutter assembly depicted in FIG. 1 and FIG. 4.

As embodied herein and depicted in FIG. 3, a perspective view of the shutter assembly optionally employed in the first embodiment of the present invention is shown. Reference is made to U.S. patent application Ser. Nos. 10/729,685, 10/900,778, and 11/609,793, which are incorporated herein by reference as though fully set forth in its entirety, for a more detailed explanation of various embodiments of the protective shutter assembly 30. The shutter assembly may be optionally employed in any of the embodiments disclosed herein.

When assembled, the upper shutter 350 is inserted into lower shutter 300 until stop members 3520 extend beyond rail guides 3082 and snap into place. This position represents the closed position, wherein the upper transverse structure 356 covers neutral aperture 304 (not shown) and upper base 358 covers hot aperture 306 (not shown). The lower shutter member 300 and the upper shutter member 350 are movable relative to each other from the closed position to the open position in response to being simultaneously engaged by the hot plug blade and the neutral plug blade of an electrical plug. To facilitate this movement, shutter members (300, 350) are made from a family of plastics having natural lubricity. These include nylon 6-6, Delrin, and Teflon. Shutter members (300, 350) may be made from a substrate on which these materials are coated, the substrate having a differing flammability or flexural characteristic.

If a foreign object having a width substantially the same as a hot plug blade is inserted into the hot receptacle opening, the shutter assembly remains closed. The foreign object causes ramp 3084, and therefore, lower shutter 300, to move. However, this foreign object insertion does not cause upper shutter 350 to move relative to shutter 300. As a result, the foreign object inserted into the hot receptacle opening strikes base member 358 of the upper shutter. On the other hand, if a foreign object having a width substantially the same as a neutral plug blade is inserted into the neutral receptacle opening, transverse structure 356 will move upper shutter 350 but not move lower shutter 300. Accordingly, the lower base member 308 does not move and the neutral aperture 304 (not shown) is not exposed. Thus, the foreign object inserted into the neutral receptacle opening strikes lower base member 308.

Only when the hot plug blade and the neutral plug blade of an electrical plug simultaneously engage ramp 3084 and ramp 3562, respectively, will the lower shutter member 300 and the upper shutter member 350 move relative to each other from the closed position to the open position. In the open position, the lower hot aperture 306 is aligned with the upper hot contact aperture 354 and, the inward edge of the lower neutral contact aperture 304 is substantially aligned with the outer edge of ramp 3562. In this position, the lower shutter 300 and the upper shutter 350 allow the plug contact blades to pass through the protective shutter 30 and engage the contacts disposed in the interior of the electrical wiring device. On the other hand, a foreign object such as a hairpin is likely to slide off of either side of ramp 3084 or ramp 3562. Obviously, if the foreign object has slid off the ramp, force cannot be applied to the object to open the corresponding shutter.

In another embodiment, the predetermined electrical plug geometry that opens the shutters may include only some of the characteristics that have been described. The geometry may include just one or more of the following: two plug blades separated by a predetermined distance, plug blades contacting the two blade structures simultaneously, a neutral plug blade having a predetermined width, or a hot plug blade having a predetermined width. Plug blade width will not matter if ramps 284 and/or 462 approach the widths of their respective contact structures.

In another embodiment, shutters (300, 350) open in response to the insertion of two objects without particular heed given to their geometries. This may be accomplished by extending the widths of ramp 3084 and ramp 3562 so that regardless of the sizes of the objects, there is nowhere for either or both objects escaping the ramps as they are inserted into the device. As such, it is assured that the two shutters will open.

The movement of the upper shutter 350 and the lower shutter 300 is effected by spring member 32. The spring member 32 is configured to bias the frameless shutter sub-assembly, i.e., lower shutter 300 and upper shutter 350, in the closed position. Spring member 32 is compressed further in the open position and, therefore, opposes movement of the frameless shutter sub-assembly from the closed position to the open position. Accordingly when the electrical plug is removed, the spring moves the frameless shutter sub-assembly from the open position to the closed position. Stated differently, only a single spring is necessary to effect the closed position of the shutter assembly.

Figure 4:
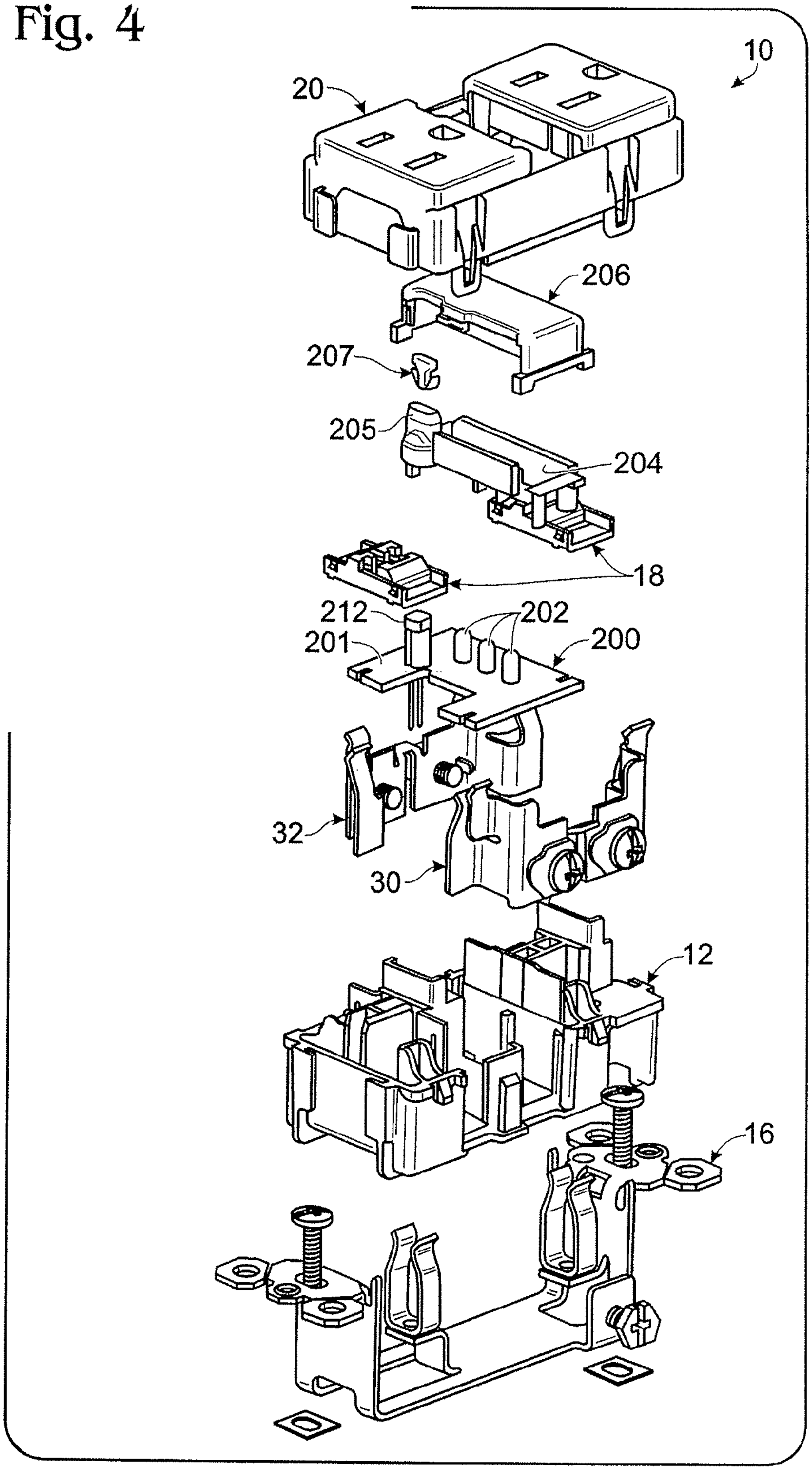
FIG. 4 is an exploded view of the device in accordance with a second embodiment of the present invention.

As alluded to above, the protective shutter assembly 30 includes a spring retainer mechanism. The spring retainer mechanism includes lower shutter retainer pocket 3080 and upper shutter retainer pocket 3560. The spring retainer mechanism is configured to retain the spring member 32 within the frameless shutter sub-assembly and substantially prevent the spring member from being separated from the frameless shutter sub-assembly. As those of ordinary skill in the art will appreciate, the protective shutter assembly 30 may be dropped and/or exposed to vibrational and/or mechanical forces during automated assembly. As shown in FIG. 4, retainer pockets (3080, 3560) are equipped with retainer lips that prevent the spring member from being jarred loose.

As embodied herein and depicted in FIG. 4, an exploded view of the device in accordance with a second embodiment 10 of the present invention is disclosed. The second embodiment is very similar to the first embodiment. Therefore, the following description is limited to the new features in the second embodiment. Accordingly, the light assembly 200 is implemented using printed circuit board 201. Printed circuit board 201 accommodates LEDs 202 and light sensor 212.

The reflector element 204 is modified to accommodate sensor 212. In particular, reflector 204 includes a tower element 205 that is configured to house the sensor 212 therein. The tower element 205 extends into the cover 20 and functions to shield sensor 212 from the light being emitted by LEDs 202. Those skilled in the art will recognize that the sensor 212 would otherwise detect the emitted light and turn LEDs 202 OFF. Ultimately, LEDs 202 would appear to blink ON and OFF as the cycle repeated. Shielding tower 205 prevents this phenomena from occurring. Lens element 207 is disposed at the top of the tower 205. Its function has been previously described. Lens 206 is inserted into cover 20 from the rear of the cover. Lens 206 is about 1.30 inches in length by about 0.6 inches in height.

Figure 5:
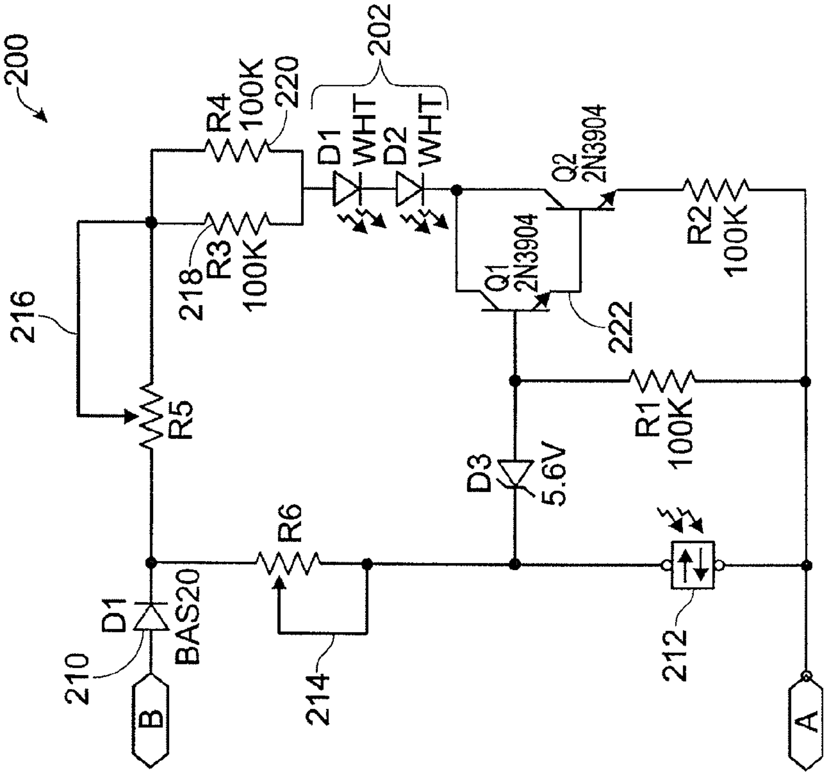
FIG. 5 is a schematic of the center night light assembly in accordance with the second embodiment of the present invention.

Referring to FIG. 5, a schematic of the center night light assembly in accordance with the second embodiment of the present invention is shown. Again, the satellite PCB 201 receives power from the receptacle terminals 30, 32, which are connected at points "A" and "B", respectively. When the ambient light is above a certain level, light sensor 212 reacts to the ambient light level and diode D3 begins to conduct. In one embodiment, sensor 212 is implemented using a light sensing diode and the amount of current conducted by sensor 212 is related to the amount of incident ambient light. As the ambient light increases past a predetermined level, which may be adjusted by potentiometer R6 in the factory, the Darlington transistor pair (Q1, Q2) are turned OFF. In particular, the current flow through D4 pulls down the base of transistor Q1. Q1, in turn, pulls down the base of Q2. When the ambient light begins to decrease, e.g., as night falls, the current flowing through sensor 212 begins to decrease accordingly. At some predetermined ambient light level, the current flowing through sensor 212 diminishes to the point where a current flow through diode D3 and resistor R1 is established. Subsequently, the transistors Q1 and Q2 are turned ON collector/emitter current in Q2 flows energizing LEDs 202.

In the schematic shown in FIG. 5, a dimmer potentiometer 216 is provided, allowing the user to adjust the brightness of the LEDs 202. In another embodiment, light sensor 212 may be implemented using a light sensing variable resistor. In this embodiment, sensor 212 and resistor 214 function as a voltage divider. Therefore, the voltage presented to diode D3 changes in accordance with the variable resistance of sensor 212. Additional features and benefits may be included. For example, the circuit may be configured to provide hysteresis. For example, the amount of ambient light at which LEDs 202 turn ON may differ from the amount of ambient light at which LEDs 202 turn OFF in accordance with the selected hysteresis curve. LEDs 202 can only be energized when two conditions are met. Device 10 must be reset and the ambient light level must fall below a predetermined level. Thus, the light assembly 200 in this embodiment is not a reset indicator per se.

In another embodiment of the present invention, the sensor circuitry may be replaced, or augmented by, proximity, motion sensing, or temperature sensing circuitry. While the sensor circuitry may function as strictly an ON/OFF control of the nightlight assembly 200, it may also be configured to regulate the power to the nightlight such that the luminous intensity is proportional to the incident ambient light. Reference is made to U.S. patent application Ser. No. 11/294,167, which is incorporated herein by reference as though fully set forth in its entirety, for a more detailed explanation of this type of light sensor circuitry.

Figure 6:
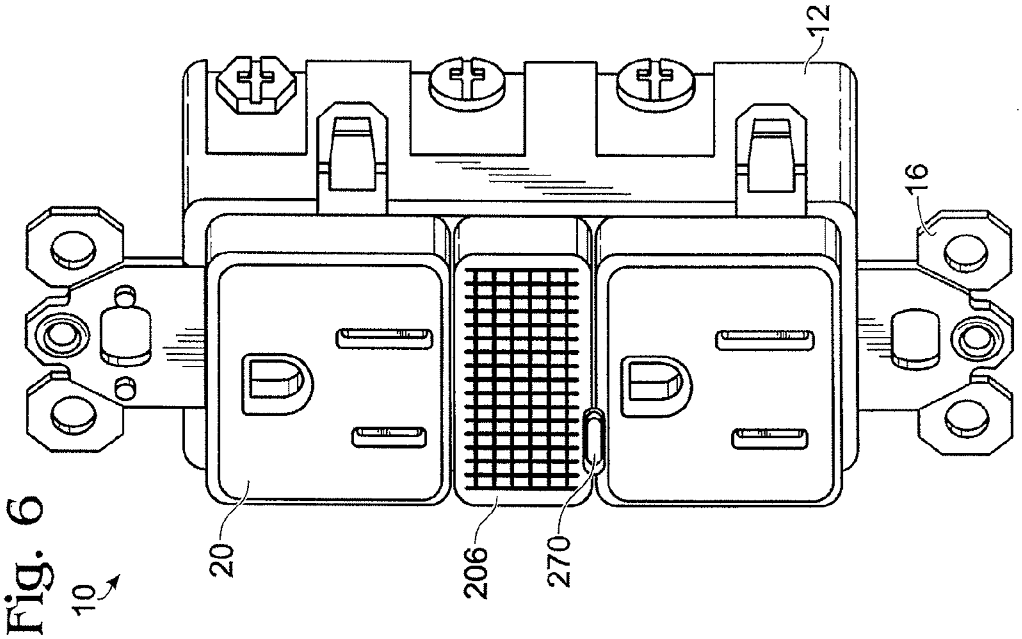
FIG. 6 is a perspective view of the fully assembled device in accordance with the second embodiment of the present invention.

FIG. 6 is a perspective view of the fully assembled device in accordance with the fifth embodiment of the present invention. The front cover 20 of the device includes light assembly lens 206 and sensor lens 207. Both lens elements (206, 207) are substantially flush with the surface of the cover 20.

Figure 7:
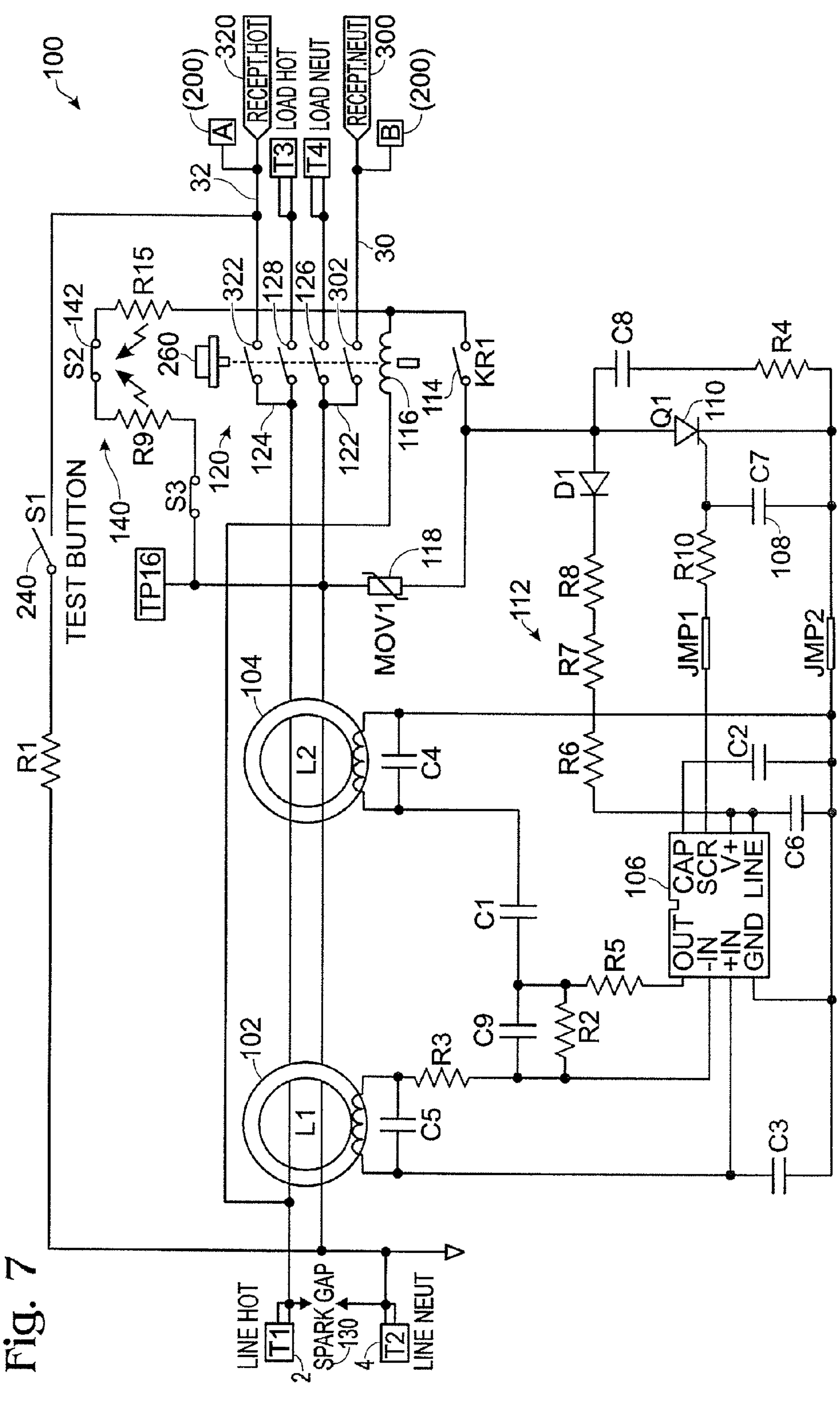
FIG. 7 is a schematic of the electrical wiring device in accordance with a third embodiment of the present invention.

As embodied herein, and depicted in FIG. 7, a schematic of a circuit protection device 10 in accordance with a third embodiment of the present invention is disclosed. In this example, the schematic shows a protective device that includes ground fault interrupter circuitry. Device 10 includes line terminals (2, 4), load terminals (6, 8), and receptacle terminals (300, 320). Again, the load terminals 6, 8 may also be referred to herein as feed-through terminals. As noted above, these terminals may be connected to wiring configured to provide power to downstream receptacles or switches. Receptacle load terminals 300, 320 are configured to mate with an electrical plug to provide power to an appliance or other such user attachable loads. The line terminals 2, 4 are electrically connected to both load terminals 6, 8 and receptacle terminals 300, 320 when device 10 is reset. When in the tripped state, the circuit interrupter 120 disconnects the load terminals from the line terminals. In addition, the circuit interrupter may disconnect at least one feed-through terminal from a corresponding receptacle terminal.

The ground fault circuitry includes a differential transformer 102 which is configured to sense load-side ground faults. Transformer 104 is configured as a grounded neutral transmitter and is employed to sense grounded-neutral fault conditions. Both differential transformer 102 and grounded-neutral transformer 104 are coupled to detector circuit 106. Power supply 112 provides power for GFI detector circuit 106. Detector 106 provides an output signal on output pin 7 based on the transformer outputs. The detector output signal is filtered by circuit 108. Filter circuit 108 filters out noise to thereby substantially reduce the possibility of false tripping. The filtered output signal is provided to the control input of SCR 110. When SCR 110 is turned ON, solenoid 116 is energized. Solenoid 116 actuates the trip mechanism to thereby trip circuit interrupter 120. The trip solenoid 116 is energized until the circuit interrupter trips to remove the fault condition. Accordingly, there is no signal at output pin 7 and SCR 110 is turned OFF. The time that the solenoid remains energized is less than about 25 milliseconds. After the fault condition has been eliminated, circuit interrupter 120 may be reset by way of reset button 260.

The present invention addresses certain end of life conditions by denying power when the device is unable to function. One end of life condition may cause the solenoid to remain energized when a fault condition is not present or when the circuit interrupter is in a tripped state. The solenoid is susceptible to burn-out when SCR 110 is permanently ON. This typically happens when SCR 110 is permanently shorted out. Most solenoids are configured to be energized only momentarily. They tend to burn out if energized for more than about 1 second. Once the solenoid burns out, the circuit interrupter is incapable of being tripped. As a result, the load terminals are permanently connected to the line terminals even when there is a fault condition.

In this embodiment, solenoid burn-out is prevented by an auxiliary switch 114. Auxiliary switch 114 is configured to open when circuit interrupter 120 is in the tripped position. If SCR 110 is shorted, or is permanently ON, auxiliary switch 114 ensures that solenoid 116 is not permanently connected to a current source. Accordingly, if reset button 260 is activated, circuit interrupter 120 resets but immediately trips in response to the trip mechanism, which in turn moves auxiliary switch 114 to the open position before solenoid 116 is able to burn out.

The auxiliary switch 114 provides other benefits. Those of ordinary skill in the art will understand that a metal oxide varistor (MOV) is frequently employed in protective devices to protect the electrical circuit from voltage surges that sometimes occur in the electrical distribution system. The end-of-life failure mode of a MOV is typically an electrical short. The resulting current can be enough to thermally damage the enclosure of the protective device. In one embodiment of the present invention, MOV 118 is connected in series with auxiliary switch 114 and trip solenoid 116 to eliminate most over-current situations. Thus, when MOV 118 reaches end of life and shorts out, trip solenoid 116 is energized to open auxiliary switch 114 and the flow of short circuit current is terminated before any damage ensues.

The hot receptacle terminal structure 32 is connected to the light assembly 200 by way of connection "A". The neutral receptacle terminal structure 30 is connected to the light assembly 200 by way of connection "B".

In another embodiment of the present invention, a secondary power source, such as a battery or a charged capacitor, may be disposed within the housing 12 as a back-up power source when the primary AC power source provided by the electrical distribution system has failed. Reference is made to U.S. patent Ser. No. 11/294,167, which is incorporated herein by reference as though fully set forth in its entirety, for a more detailed explanation of a secondary power source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:

a housing including a plurality of line terminals and a plurality of load terminals;

a cover assembly coupled to the housing, the cover assembly including a first set of receptacle openings and a second set of receptacle openings;

a plurality of receptacle terminals disposed in the housing and coupled to the plurality of load terminals, the plurality of receptacle terminals including a first set of receptacle terminals in communication with the first set of receptacle openings and a second set of receptacle terminals in communication with the second set of receptacle openings;

a first protective shutter assembly disposed in the cover assembly between the first set of receptacle openings and the first set of receptacle terminals and a second protective shutter assembly disposed in the cover assembly between the second set of receptacle openings and the second set of receptacle terminals, each protective shutter assembly being configured to move from a closed position to an open position in response to engaging a set of plug blades to thereby establish electrical continuity between the corresponding set of receptacle terminals and the set of plug blades; and a light assembly disposed in a central portion of the cover assembly between the first set of receptacle openings and the second set of receptacle openings, the light assembly being coupled to the plurality of line terminals or the plurality of load terminals, the light assembly having a light transmission region occupying a substantial portion of a width of the cover assembly, the light assembly being selectively driven from a deenergized state to a light emitting state in response to a predetermined stimulus, the light assembly directing emitted light into a spatial volume proximate the device via the light transmissive region in the light emitting state.

2. The device of claim 1, wherein the first protective shutter assembly and the second protective shutter assembly are frameless shutter assemblies, each frameless shutter assembly comprising a first shutter member and a second shutter member configured to move from a closed position to an open position in response to being engaged by a set of plug blades having a form factor conforming to the first set of receptacle openings or the second set of receptacle openings.

3. The device of claim 1, further comprising a mounting strap disposed between the housing and the cover assembly, the mounting strap including a first mounting ear and a second mounting ear disposed at either end of the device and an interior portion disposed between the first mounting ear and the second mounting ear, the interior portion being disposed in a plane offset from the first mounting ear and the second mounting ear a first distance to accommodate each frameless shutter assembly, the first mounting ear and the second mounting ear being coplanar.

4. The device of claim 1, wherein each protective shutter assembly is configured to move from a closed position to an open position only in response to being engaged by a set of plug blades having a predetermined plug blade geometry, the set of plug blades establishing electrical continuity with a corresponding set of receptacle terminals in the open position.

5. The device of claim 1, further comprising:

a fault detection assembly coupled to the plurality of line terminals, the fault detection assembly being configured to provide a fault detection output in response to detecting a fault condition;

a circuit interrupter coupled between the plurality of line terminals and the plurality of load terminals, the circuit interrupter being configured to establish at least one electrically continuous path between the plurality of line terminals and the plurality of load terminals in a reset state and disconnect the at least one electrically continuous path in response to the fault detection output to enter a tripped state; and a reset mechanism coupled to the circuit interrupter, the reset mechanism being configured to reset the circuit interrupter to thereby reestablish the at least one electrically continuous path.

6. The device of claim 5, wherein the fault detection assembly includes a ground fault, transient voltage, or an arc fault detection circuit.

7. The device of claim 5, wherein the light assembly includes a lighting circuit and a plurality of light emitting diodes, the lighting circuit being coupled to the plurality of load terminals, the predetermined stimulus being generated provided by the reset mechanism when the circuit interrupter is driven from the tripped state to the reset state, the lighting circuit being configured to energize the light emitting diodes when the device is in the reset state.

8. The device of claim 5, further comprising a separator element disposed between the cover assembly and the housing, a printed circuit board disposed between the separator and the housing, the printed circuit board including the fault detection assembly and the circuit interrupter disposed thereon, the light assembly being disposed between the separator and the front cover, the light assembly including a plurality of light emitting diodes mounted in a portion of the separator in optical communication with the light transmissive region, the plurality of light emitting diodes being configured to receive power from the printed circuit board.

9. The device of claim 5, further comprising a separator element disposed between the cover assembly and the housing to form a lower compartment and an upper compartment, components implementing the fault detection assembly and the circuit interrupter being mounted to a first printed circuit board disposed in the lower compartment, the plurality of receptacle terminals being disposed in the upper compartment, the light assembly being at least partially implemented on a second printed circuit board disposed in the upper compartment and electrically coupled to the plurality of receptacle terminals.

10. The device of claim 9, wherein the plurality of receptacle terminals include a plurality of fixed contacts in communication with the circuit interrupter by way of openings in the separator.

11. The device of claim 9, wherein the second printed circuit board implements a lighting circuit and includes a plurality of light emitting diodes mounted thereon, the lighting circuit being configured to energize the plurality of light emitting diodes when the circuit interrupter is in the reset state.

12. The device of claim 9, wherein the second printed circuit board implements a lighting circuit including sensor and a plurality of light emitting diodes, the lighting circuit being configured to energize the light emitting diodes in response to a sensor signal.

13. The device of claim 12, wherein the sensor includes an ambient light sensor, the sensor signal being indicative of an intensity of ambient light.

14. The device of claim 12, wherein the ambient light sensor is configured to generate a current signal as a function of the intensity of ambient light, or the ambient light sensor is characterized by a variable resistance, the magnitude of the variable resistance being a function of the intensity of ambient light.

15. The device of claim 12, further comprising:

a reflector member configured to accommodate the plurality of light emitting diodes and the ambient light sensor; and a lens element disposed over the reflector member in the light transmissive region, the lens element being configured to refract light emitted by the light emitting diodes in accordance with a predetermined pattern.

16. The device of claim 1, wherein the light assembly is disposed on a printed circuit board and further comprises:

a plurality of light emitting diodes;

an ambient light sensor; and a control circuit coupled to the plurality of light emitting diodes and the ambient light sensor, the control circuit being configured to energize the light emitting diodes in response to a sensor signal from the ambient light sensor, the sensor signal being indicative of an intensity of ambient light.

17. The device of claim 16, wherein the ambient light sensor is configured to generate a current signal as a function of the intensity of ambient light.

18. The device of claim 16, wherein the ambient light sensor is characterized by a variable resistance, the magnitude of the variable resistance being a function of the intensity of ambient light.

19. The device of claim 16, further comprising:

a user accessible control element; and a dimmer circuit coupled to the user accessible control element and the light emitting diodes, the dimmer circuit being configured to regulate an intensity of light being emitted by the light emitting diodes.

20. The device of claim 16, further comprising:

a reflector member configured to accommodate the plurality of light emitting diodes and the ambient light sensor; and a lens element coupled to the central portion and covering the reflector member, the lens element being configured to refract light emitted by the light emitting diodes in accordance with a predetermined pattern.

21. The device of claim 20, wherein the lens element is implemented as a lenticular lens.

22. The device of claim 1, wherein the predetermined stimulus includes a switch being closed when a set of plug blades is removed from either the first set of receptacle terminals or the second set of receptacle terminals.

23. The device of claim 1, wherein the predetermined stimulus includes AC power being applied to the plurality of line terminals.

24. An electrical wiring device comprising:

a housing including a plurality of line terminals;

a cover assembly coupled to the housing, the cover assembly including a first set of receptacle openings and a second set of receptacle openings;

a plurality of receptacle terminals disposed in the housing and coupled to the plurality of line terminals, the plurality of receptacle terminals including a first set of receptacle terminals in communication with the first set of receptacle openings and a second set of receptacle terminals in communication with the second set of receptacle openings;

a first protective shutter assembly disposed in the cover assembly between a portion of the first set of receptacle openings and the first set of receptacle terminals and a second protective shutter assembly disposed in the cover assembly between the second set of receptacle openings and the second set of receptacle terminals, each protective shutter assembly being configured to move from a closed position to an open position in response to engaging a set of plug blades to thereby establish electrical continuity between the corresponding set of receptacle terminals and the set of plug blades; and a light assembly disposed in a central portion of the cover assembly between the first set of receptacle openings and the second set of receptacle openings, the light assembly being electrically coupled to the plurality of line terminals, the light assembly having a light transmission region occupying a substantial portion of a width of the user accessible surface of the cover assembly, the light assembly being selectively driven from a deenergized state to a light emitting state in response to a predetermined stimulus, the light assembly directing emitted light into a spatial volume proximate the device via the light transmissive region in the light emitting state.

25. The device of claim 24, wherein the first protective shutter assembly and the second protective shutter assembly are frameless shutter assemblies, each frameless shutter assembly comprising a first shutter member and a second shutter member configured to move from a closed position to an open position in response to being engaged by a set of plug blades having a form factor conforming to the first set of receptacle openings or the second set of receptacle openings.

* * * * *